US008903539B2

(12) United States Patent
Hasegawa et al.

(10) Patent No.: US 8,903,539 B2
(45) Date of Patent: Dec. 2, 2014

(54) EFFICIENT DISTRIBUTION AND SELECTION OF STORAGE MEDIA IN A STORAGE MEDIUM LIBRARY

(71) Applicant: International Business Machines Corporation, Armonk, NY (US)

(72) Inventors: Tohru Hasegawa, Sagamihara (JP); Takamasa Hirata, Tokyo (JP); Naoki Imai, Yokohama (JP); Masanori Kamiya, Sagamihara (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/683,433

(22) Filed: Nov. 21, 2012

(65) Prior Publication Data
US 2014/0142742 A1    May 22, 2014

(51) Int. Cl.
G06F 7/00       (2006.01)
B65G 1/137      (2006.01)
G11B 15/68      (2006.01)

(52) U.S. Cl.
CPC ............ G11B 15/6885 (2013.01); B65G 1/137 (2013.01)
USPC ........... 700/214; 700/213; 700/215; 700/220; 700/221; 700/222; 700/228; 700/229

(58) Field of Classification Search
None
See application file for complete search history.

(56) References Cited

U.S. PATENT DOCUMENTS

| 4,932,826 | A | 6/1990 | Moy et al. |
| 6,519,678 | B1 | 2/2003 | Basham et al. |
| 6,693,758 | B2 | 2/2004 | Patterson et al. |
| 6,810,306 | B1 | 10/2004 | Ostwald |
| 6,842,841 | B1 * | 1/2005 | Kuik et al. ..................... 711/203 |
| 6,885,911 | B1 | 4/2005 | Smith |
| 7,672,754 | B1 * | 3/2010 | Haustein et al. .............. 700/214 |

FOREIGN PATENT DOCUMENTS

WO        8805593        7/1988

OTHER PUBLICATIONS

"U.S. Appl. No. 13/683,425 Final Office Action", Feb. 27, 2014, 10 pages.
"U.S. Appl. No. 13/768,606 Office Action", Dec. 27, 2013, 12 pages.
"U.S. Appl. No. 13/767,370 Office Action", Mar. 31, 2014, 8 pages.
"U.S. Appl. No. 13/683,425 Office Action", May 6, 2014, 7 pages.
"U.S. Appl. No. 13/768,606 Office Action", May 6, 2014, 6 pages.

* cited by examiner

Primary Examiner — Yolanda Cumbess
(74) Attorney, Agent, or Firm — DeLizio Gilliam, PLLC

(57) ABSTRACT

An apparatus includes a network interface, a processor and a computer readable storage medium. The processor is coupled with the computer readable storage medium. The computer readable storage medium has computer readable program code embodied therewith. The computer readable program code, when executed by the processor, causes the processor to determine the state of a storage medium library and determine distribution for a plurality of distributable components within the storage medium library based, at least in part, on the state of the storage medium library. The computer readable program code also causes the processor to, responsive to a determination of the distribution for the plurality of distributable components within the storage medium library, issue commands distributing the plurality of distributable components within the storage medium library in accordance with the distribution.

13 Claims, 8 Drawing Sheets

EFFICIENT DISTRIBUTION AND SELECTION OF STORAGE MEDIA IN A STORAGE MEDIUM LIBRARY

BACKGROUND

Embodiments of the inventive subject matter generally relate to the field of mass storage systems, and, more particularly, to the efficient movement of storage media in a storage medium library.

Mass storage systems are utilized in scenarios where large amounts of data are handled, such as data centers. Although many of these mass storage systems utilize a large number of individual storage media and are designed to function with little human intervention, movement of storage media within these systems can be slow and inefficient. Reducing the amount of time taken to move storage media can reduce the amount of time a particular software program is idle waiting for the movement to complete, and reducing the amount of movement can positively impact the cost of electricity.

SUMMARY

Embodiments of the inventive subject matter include an apparatus. The apparatus includes a network interface, a processor and a computer readable storage medium coupled with the processor. The computer readable storage medium includes computer readable program code. The computer readable program code, when executed by the processor, causes the processor to determine the state of a storage medium library and determine a distribution for a plurality of distributable components within the storage medium library. The determination of the distribution is based, as least in part, on the state of the storage medium library. The computer readable program code also causes the processor to, in response to a determination of a distribution for the plurality of distributable components, issue commands distributing the plurality of distributable components within the storage medium library in accordance with the distribution.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
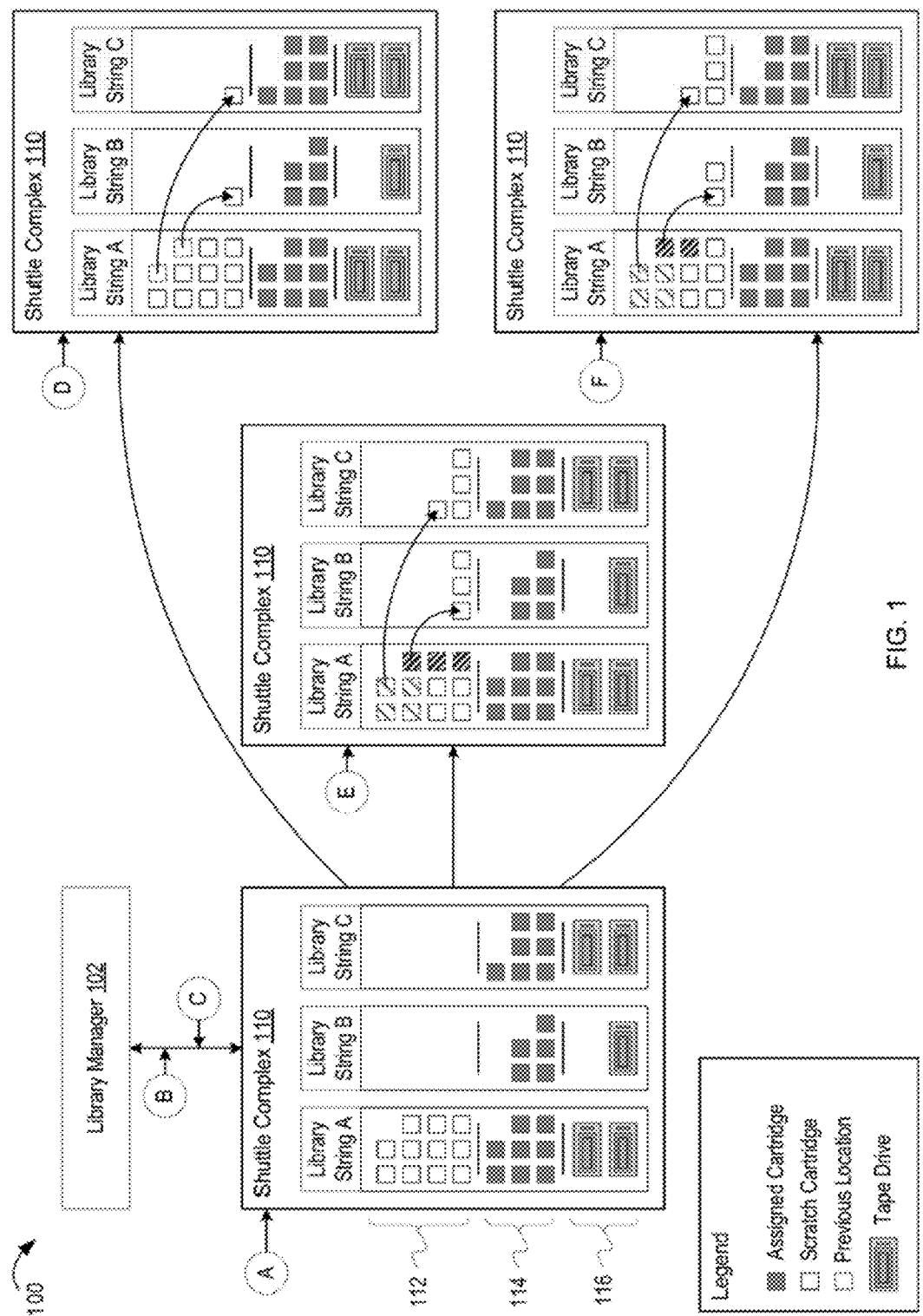
FIG. 1 depicts the interactions between a library manager and a shuttle complex to distribute scratch cartridges within the tape library.

The description that follows includes exemplary systems, methods, techniques, instruction sequences and computer program products that embody techniques of the present inventive subject matter. However, it is understood that the described embodiments may be practiced without these specific details. For instance, although examples refer to tape libraries, the inventive subject matter is not so limited, and can also apply to other mass storage systems. In other instances, well-known instruction instances, protocols, structures and techniques have not been shown in detail in order not to obfuscate the description.

Mass storage systems can take many forms. One common form is an array of hard drives. These are particularly useful when access to all information at once is beneficial. Another type, referred to as a storage library or storage medium library, contains a large number of removable storage media, and a number of drives that can read and write to this removable media. The storage medium library is particularly useful when large amounts of data need to be stored but not accessed as frequently. Tape libraries and tape cartridges are examples of storage medium libraries and storage media, respectively. Because it is easier to understand the concepts embodied in the inventive subject matter if discussed in the context of a specific type of storage medium library, tape libraries and tape cartridges will be used hereinafter. The inventive subject matter is not so restricted, and can apply to any storage medium library.

Tape library technology has been developed that allows for easy expansion and automated functionality. For example, individual tape library systems are called library frames. These systems are large, single systems that contain one or more tape drives, tape cartridges, storage for tape cartridges (hereinafter referred to as cartridges), and a robotic arm or other mechanism that can move the cartridges from their storage location and insert them into an unused tape drive, or vice versa. The library frames may contain a different number of tape drives and cartridges. For example, one may contain five tape drives, and fifty cartridges. This is possible because not all cartridges are in use at once, but rather spend most of the time stored. It is possible that only a small fraction of cartridges are being used at one time.

Library frames can be connected side-by-side to form library strings. The tape frames have a door or open space on each side that allows a car to move between the individual library frames. Thus, if five library frames are arranged into a library string, the first library frame can use its robotic arm to put the tape into the car. The car can then travel to the fifth library string, which can then use its robotic arm to remove the cartridge and insert it into a tape drive or storage location. Library strings can also be connected to form shuttle complexes by means of shuttle connections. A shuttle connection connects to at least two library strings arranged in rows and allows a car to travel between library strings, similar to how the car travels between library frames. The term "tape library" will hereinafter by used to refer to shuttle complexes unless a specific distinction is to be made.

Cartridges can exist in at least two states. The first is a cartridge that is available to be written to by any requesting software program. These available cartridges, hereinafter referred to as "scratch cartridges," can be new cartridges that have not been written to since being added to the tape library or cartridges that were previously written to by software programs but are no longer needed. The second is a cartridge that is assigned to a particular software program. These cartridges, hereinafter referred to as "assigned cartridges," have been written to by a particular software program, and may be read from at a future point. The assigned cartridges are restricted to use by the software program to which they are assigned.

Tape libraries can be managed by software designed to abstract the tape library operations from the software that reads and writes to the cartridges. The software or system that manages the tape library is referred to as a "library manager." The library manager can exist as a component of the tape library or outside of the tape library, but connected in a manner that allows communication between the tape library and the library manager. When the term "tape library" is used hereinafter, it includes the library manager. When referring to the library manager communicating with the tape library, the library manager is communicating with other components within the tape library, and is not being described as a separate entity.

The library manager can provide an interface for other software that makes using the tape library simpler than it would be if the software interfaced directly with the tape library. For example, instead of searching through all the individual cartridges and drives to find ones that are available, the software requests a file handle from the library manager. The library manager then finds an appropriate cartridge and drive, instructs the tape library to mount the cartridge in the drive, and provides a file handle that, when written to, writes the data to the appropriate drive.

The average time taken to move a cartridge from a source location to a target location within a library string can be less than ten seconds. The average time taken to move a cartridge from a source location in one library string to a target location in an adjacent library string can be nearly forty seconds. The average time taken increases with further expansion. Thus, a program requesting use of a cartridge may wait for nearly forty seconds if a cartridge is located one library string away from an available drive.

Time spent waiting for a cartridge to be mounted into a tape drive is time that cannot be spent processing data or accomplishing a task. The tape library may not be able to fulfill other requests while it moves cartridges around, further compounding the problem. Furthermore, electricity makes up one of the largest costs for large data centers, thus, optimizing existing solutions by reducing the amount of electricity used can have an impact on the electricity costs. The more movement involved in operating a tape library, the more electricity is used. Thus, reducing both the amount of time spent waiting for a request and the amount of electricity used can be important goals for installations that utilize a tape library.

Various metrics can be used to measure the performance of a tape library. For example, the amount of time a software program waits for a request to be serviced by the tape library can be used, as discussed above. This can be combined with data throughput rates and other aspects to determine the total length of time taken to service the request. Also as discussed above, the amount and cost of electricity use can be a useful metric. Indirect measurements of these can be used as well. For example, tracking the distance cartridges travel while servicing requests can serve to measure the efficiency of the tape library because the longer the distance traveled, generally, the longer it takes. Similarly, the more movement required, generally, the more electricity required. Thus, a reduction in total movement can bring about faster, more efficient operation as well as lower overhead.

Additionally, it may be a goal for a tape library to move various components around when no requests are pending. For example, if a software program makes a request for a cartridge, any time spent moving that cartridge before making it available is time that the software program is waiting. If no requests are pending, the tape library can move that cartridge closer to an available tape drive, reducing the amount of travel in response to a request, and thus reducing the amount of time the software program waits. In other words, if a tape library can anticipate movement of a cartridge prior to an actual request, the tape library can reduce the amount of time a software program waits by moving the cartridge when no request is pending.

A tape library can be designed to increase the efficiency of locating and moving a scratch cartridge to a drive that has been selected for use. By distributing the scratch cartridges in accordance with certain distributions, the tape library reduces the distance a scratch cartridge travels to get to an available drive when requested by a software program. Reducing the distance traveled by a scratch cartridge to service a software program request reduces the amount of time the software program waits.

FIG. 1 depicts the interactions between a library manager and a shuttle complex to distribute scratch cartridges within the tape library. FIG. 1 includes a tape library system 100, including a library manager 102 and a shuttle complex 110. The shuttle complex 110 includes three library strings: library string A, library string B, and library string C. The depiction of each library string is broken into three sections, one for a set of scratch cartridges 112, one for a set of assigned cartridges 114, and one for a set of tape drives 116. All sets 112, 114, and 116 may be empty. Each library string is connected in a way that allows cartridges to be moved from any library string to any other library string, such as by a shuttle connection (not depicted).

Stage A represents the beginning state of the tape library. There are eleven scratch cartridges in library string A and no scratch cartridges in library string B or library string C. There are eight assigned cartridges in library string A, five assigned cartridges in library string B, and seven assigned cartridges in library string C. There are two tape drives in library string A, one in library string B, and two tape drives in library string C.

Scenarios, such as in stage A, where there are a much larger number of scratch cartridges in one library string are not uncommon. A common configuration for a library string includes one library frame with an input-output slot to insert and remove cartridges into the tape library. When expanding the tape library to include multiple library strings, the additional library strings may not have a library frame with an input-output slot because the cartridges can be moved from the library string with an input-output slot to the others. Thus, when an administrator inserts cartridges, they would all start in the library string with the input-output slot, potentially creating a scenario where all scratch cartridges are in the single library string.

At stage B, the library manager 102 determines the current state of the shuttle complex 110. The library manager 102 may be implemented in various ways, and thus how the library manager 102 determines the current state of the shuttle complex 110 can similarly vary. For example, the library manager 102 can maintain data that represents the state of the shuttle complex 110. Because software communicates to the library manager 102 instead of the shuttle complex 110, the library manager 102 can update the data that represents the state of the shuttle complex 110 in response to software requests. In these implementations, the library manager 102 is notified of any action taken by the shuttle complex 110 not in response to a request from the library manager 102. In other implementations, the library manager 102 can poll the shuttle complex 110 at regular intervals to get the current state of the shuttle complex 110. This may involve polling the shuttle complex 110 or polling each individual library string. Additionally, the library manager 102 can determine the state of the shuttle complex 110 at the time of a request.

At stage C, the library manager 102 determines if any scratch cartridges should be distributed to other library strings. For example, the library manager 102 may determine that because library string B and library string C do not have any scratch cartridges at stage A, at least one scratch cartridge can be moved from library string A to library string B and library string C. The library manager 102 then sends a series of instructions to the shuttle complex 110 or the individual components of the shuttle complex 110 in order to redistribute the scratch cartridges 112.

Stage D depicts the shuttle complex 110 after the library manager 102 has issued a series of instructions to the shuttle complex 110 to distribute one scratch cartridge from library string A to library string B and library string C. The specific series of instructions will vary between implementations. For example, in a tape library that implements the Small Computer System Interface (SCSI), the library manager 102 can issue two "MOVE MEDIA" commands, specifying the media to move (which specific scratch cartridges) and the target library strings (library string B and library string C).

This embodiment provides a technique that satisfies the basic condition that as many library strings as possible have at least one scratch cartridge. If the number of scratch cartridges 112 is less than the number of library strings, at least one library string will be without a scratch cartridge, but this is true of any embodiment. Additionally, having only one scratch cartridge in a library string means that if a tape drive in that library string is available and the scratch cartridge in that library string is used to fulfill a request, the library string has no more scratch cartridges. The library manager 102 then distributes another scratch cartridge to the library string if available. In a scenario where there are many requests for scratch cartridges within a short period of time, the library manager 102 may still end up transferring scratch cartridges from other library strings.

Stage E depicts the shuttle complex 110 after the library manager 102 has issued a series of instructions to the shuttle complex 110 to distribute the scratch cartridges 112 as evenly as possible. The library manager 102 attempts to distribute the scratch cartridges 112 such that each library string has an equal number of scratch cartridges. Thus, the library manager 102 divides the total number of scratch cartridges 112 by the number of library strings. If the number of library strings divides evenly into the total number of scratch cartridges 112, the number of scratch cartridges 112 in each library string will be equal. If the number of library strings does not divide evenly into the total number of scratch cartridges 112, as in this example, at least one library string will have fewer scratch cartridges 112 than the other library string(s). In this example, there are eleven scratch cartridges 112 and three library strings. Thus, two library strings will have four scratch cartridges and one will have three.

Assuming the number of scratch cartridges is not less than the number of library strings, this embodiment provides at least one scratch cartridge per library string, and can provide for multiple scratch cartridges per library string. Thus, there is less of a chance that a library string will be without a scratch cartridge after a single request is fulfilled using a tape drive in the library string. This technique results in equal or greater efficiency than only ensuring each library string has one scratch cartridge. For example, assume the two tape drives in library string C are the only available tape drives 116 and the library manager 102 receives two requests for scratch cartridges 112. The shuttle complex 110 as depicted at stage D would be able to fulfill one request, then would move one scratch cartridge from another library string. Library string C would then have no scratch cartridges after fulfilling both requests. The shuttle complex 110 as depicted at stage E, on the other hand, would be able to fulfill both requests without moving a scratch cartridge from another library string, resulting in more efficient operation. Additionally, library string C would still have two scratch cartridges after fulfilling both requests.

However, this embodiment can still lead to inefficient operation in some scenarios. For example, assume a tape library has two library strings, and the first library string has ten tape drives and the second library string has one tape drive. The probability of the first library string having a free tape drive is greater than that of the second library string. Thus, if scratch cartridges are distributed evenly, it is likely that the first library string will use all of its scratch cartridges before the second library string does. Thus, the library manager will then redistribute the scratch cartridges from the second library string to the first. This problem can be solved by distributing the scratch cartridges in proportion to the number of tape drives in each library string.

Stage F depicts the shuttle complex 110 after the library manager 102 has issued a series of instructions to the shuttle complex 110 to distribute the scratch cartridges 112 in proportion to the number of tape drives in each library string. The library manager 102 can determine the number of scratch cartridges to go to each library string by first dividing the total number of scratch cartridges in the tape library by the total number of tape drives in the tape library and taking the floor of the result. The library manager 102 then takes the result and multiplies the number of tape drives in each library string to get the number of scratch cartridges in the respective library strings. If the number in the first step resulted in a fractional value, there will be scratch cartridges left over. The library manager 102 can distribute these in various ways, and may change methods based on how many scratch cartridges are left over. For example, the library manager 102 can distribute the remaining scratch cartridges one-by-one starting with the library string with the largest number of tape drives and going in decreasing order. If the remaining number of scratch cartridges is small, the library manager 102 can leave the scratch cartridges in their source library strings to avoid expending the electricity and potentially taking time away from future requests for usage of the shuttle complex 110.

In the depiction of the shuttle complex 110 corresponding to stage F, the library manager 102 moved two scratch cartridges to library string B and four scratch cartridges to library string C, leaving five scratch cartridges in library string A. To determine these numbers, the library manager 102 first divides the total number of scratch cartridges (eleven) by the total number of tape drives (five). This results in the value of "two" after the floor of the quotient is taken. The library manager 102 then multiplies this value by the number of tape drives in each library string. Thus, the library manager determines that four scratch cartridges should go in library string A and library string C (two multiplied by two), and two scratch cartridges should go in library string B (two multiplied by one). There is one remaining scratch cartridge, which is left in the source library string A. Although the result appears very close to the result in stage E, for larger number of scratch cartridges the results continue to diverge in similarity. For example, if there were twenty-two scratch cartridges, the embodiment used in stage E would result in seven scratch cartridges in two library strings and eight in one library string. The embodiment used in stage F would result in eight scratch cartridges in two library strings and four scratch cartridges in one library string, with two scratch cartridges to be distributed as determined by the library manager 102.

Due to the potentially random nature of tape library use, no set distribution may be the most efficient. Thus, the library manager 102 can track the usage patterns of the shuttle complex 110, and, in some embodiments, the library manager 102 can use the usage patterns to determine how to distribute the scratch cartridges. For example, the library manager 102 may determine that a first library string uses twice as many scratch cartridges as a second library string, even though it has the same number of tape drives. The library manager 102 can then distribute twice as many tape drives to the first library string as it distributes to the second library string based on the usage pattern.

Additionally, the library manager 102 can include all discussed embodiments and techniques, and chose among them dynamically. For example, the library manager 102 may determine that under certain usages scratch cartridges are used by library strings in proportion to the number of tape drives each library string contains. Thus, the library manager 102 may distribute the cartridges accordingly in anticipation of those usages. The library manager 102 may also determine that at other times, the usage pattern appears random, and thus may distribute the scratch cartridges evenly across all library strings.

Although the examples discussed above involve a set of library strings where all scratch cartridges begin in one library string, the inventive subject matter is not so limited. For example, two of three library strings can contain multiple scratch cartridges, while the third library string contains none. The library manager 102 can then distribute the scratch cartridges from both library strings with multiple scratch cartridges to the third library string. In other words, the specific scratch cartridges moved can begin in any library string and be distributed to any other library string.

Similar techniques can be applied within library strings as well. For example, the library manager 102 can ensure that scratch cartridges are distributed evenly throughout the library string, maximizing the chances that a scratch cartridge will be located in a library frame with an available tape drive. If a particular library string has five library frames and ten scratch cartridges, the library manager 102 can distribute two scratch cartridges to each library frame. Other distributions, such as those that distribute scratch cartridges in proportion to the number of drives and based on usage patterns, can be used as well. For library strings with fewer scratch cartridges than library frames, the scratch cartridges can be distributed in a manner that minimizes the distance travelled to an available drive, as described above.

The inventive subject matter is not limited to scratch cartridges. Similar techniques can be applied to distributing assigned cartridges as well. The number of assigned cartridges in one library string or library frame may be higher than the number of assigned cartridges in other library strings or library frames. Thus, these assigned cartridges may be distributed using the similar techniques as described herein.

Similar techniques can be used when a tape library has multiple shuttle connections. For example, assume the shuttle complex 110 has three shuttle connections connecting library string A, library string B, and library string C. It is possible to have the three cars associated with the three shuttle connections located in one library string. If all three cars are in library string A and a scratch cartridge is to be moved from library string C to library string A, one of the cars travels all the way to library string C to retrieve the scratch cartridge. The library manager 102 can distribute the cars such that the distance between a car and any one library string is minimized or the movements are executed more efficiently. For example, if there are three library strings and three shuttle connections, the library manager 102 can keep one car at each library string. If there is only one shuttle connection for three library strings, the library manager 102 can keep the single car in library string B, making the maximum distance to travel for the initial movement one library string. The library manager 102 could also use usage patterns to determine an efficient location for the cars. For example, in a tape library with three shuttle connections and three library strings, the library manager 102 may determine that the tape library 100 fetches scratch cartridges from one library string more often than the others. Thus, the library manager can decide to keep two cars in the library string that holds a larger number of scratch cartridges.

Figure 2:
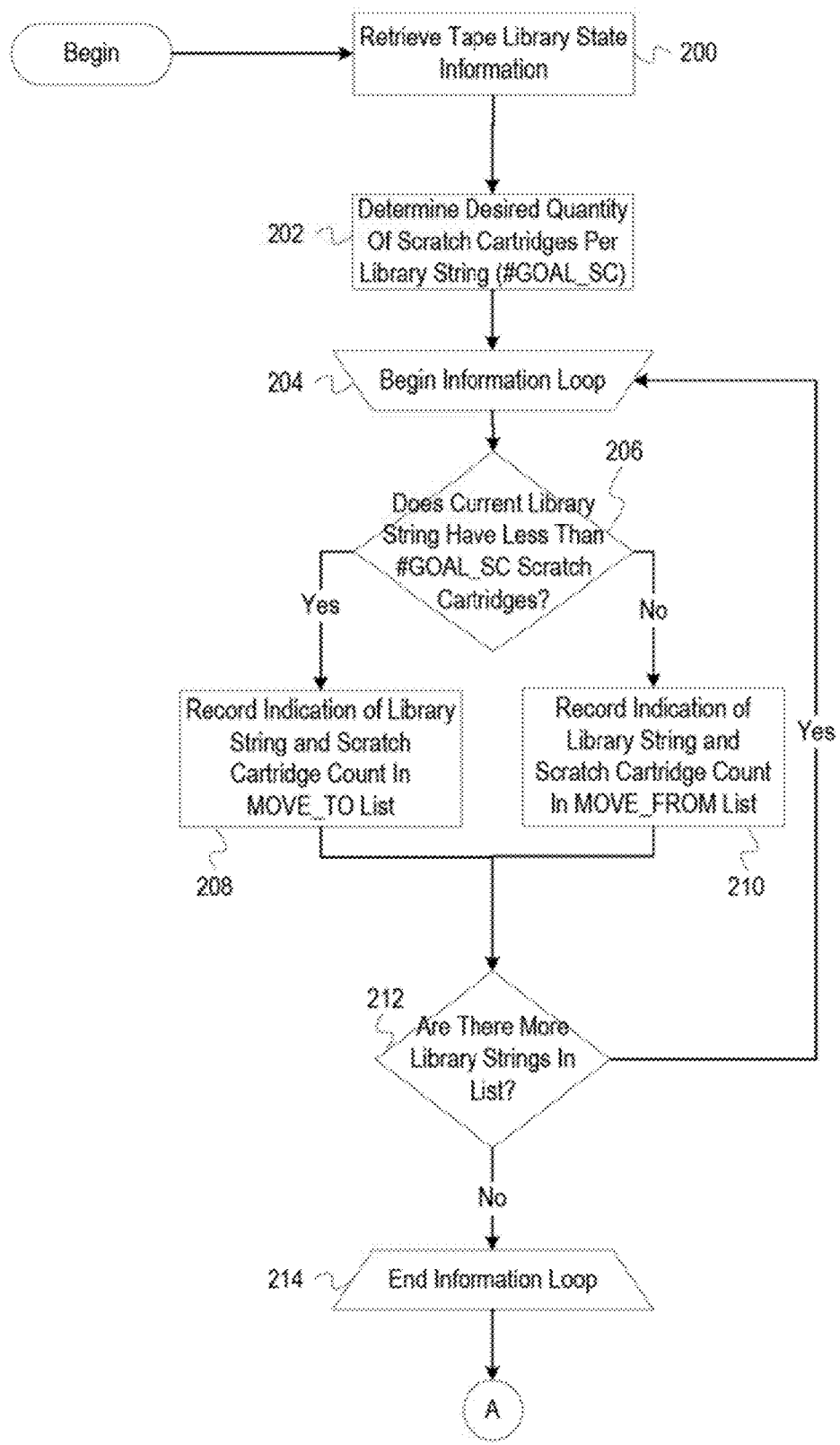
FIG. 2 depicts a first flowchart of example operations a library manager can perform to distribute scratch cartridges to a set of interconnected library strings in a tape library.
Figure 3:
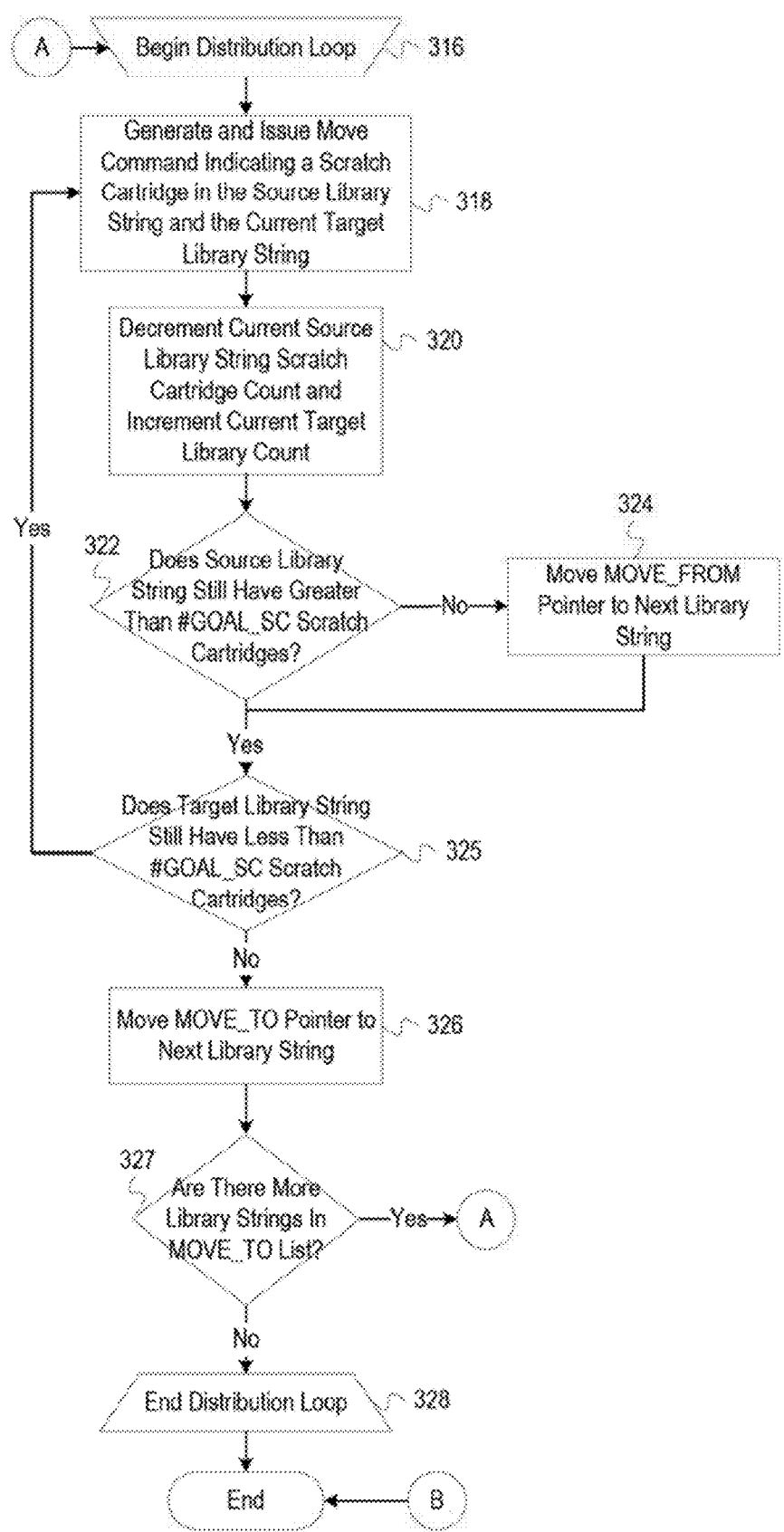
FIG. 3 depicts a second flowchart of example operations a library manager can perform to distribute scratch cartridges to a set of interconnected library strings in a tape library.

FIG. 2 and FIG. 3 depict a flowchart of example operations a library manager can perform to distribute scratch cartridges to a set of interconnected library strings in a tape library.

At block 200, the library manager retrieves the tape library state information. The tape library state information (state information) can provide details on the tape library configuration, such as how many library strings exist in the tape library, how many library frames exist in each library string, how each component is interconnected, etc. The state information can also provide the current location of all moveable components and any pending or in-progress operations. The library manager can retrieve a subset of the information it needs, supplementing the information by retrieving more information as needed throughout the process. The library manager can retrieve the state information by requesting it from the shuttle complex, compiling it by sending requests (individual or combined into one) for the individual pieces of information to the shuttle complex, or by maintaining it in memory. After the library manager retrieves the state information, control then flows to block 202.

At block 202, the library manager determines the number of scratch cartridges that each library string should have, which will vary based on the distribution used. For example, in the first distribution discussed above, the library manager attempts to have at least one scratch cartridge in each library string. Thus, the goal number of scratch cartridges for each library string is one. The goal number of scratch cartridges will be identified hereinafter by "#GOAL_SC." For this distribution, the only goal is to have one scratch cartridge per library string. Thus, any library string with more than one scratch cartridge will have "leftover" scratch cartridges. For this particular distribution, the leftover scratch cartridges can be ignored.

In the second distribution discussed above, the library manager attempts to distribute the scratch cartridges evenly among the library strings. Thus, the library manager determines #GOAL_SC by dividing the total count of scratch cartridges in the tape library by the total count of library strings. The number of leftover scratch cartridges will be any remainder resulting from determining the #GOAL_SC. Because the number of leftover scratch cartridges will be less than the number of library strings, the library manager may choose to not distribute the leftover scratch cartridges. In implementations where the number of library strings is large and a few library strings have a large portion of the scratch cartridges, the library manager may choose to distribute one leftover scratch cartridge to as many library strings as possible.

In the third distribution discussed above, the library manager attempts to distribute the scratch cartridges in proportion to the number of tape drives in each library string. One way to determine this is by dividing the total number of scratch cartridges in the tape library by the total number of library strings in the tape library, then taking the floor of the result. This constant value is then multiplied by the number of tape drives in each library string to get the #GOAL_SC for each respective library string. This differs from the previous two distributions in that each library string may have a different #GOAL_SC, whereas in the prior distributions each library string had the same #GOAL_SC. The count of leftover scratch cartridges will be less than the number of tape drives in the tape library. The library manager may choose not to distribute the leftover scratch cartridges, or may choose to distribute them in a variety of ways. For example, the library manager may distribute the leftover cartridges as evenly as possible to each library string or can distribute them in to the library strings with the largest number of tape drives.

In the fourth distribution discussed above, the library manager determines the distribution based on the usage pattern of the tape library. Using the usage pattern, the library manager can determine an individual #GOAL_SC for each library string. For example, if the library string determines that the first library string uses twice as many scratch cartridges as the second, the library manager can assign twice as many scratch cartridges to the first library string as the second. This can happen regardless of the number of tape drives in the library strings. The count of leftover scratch cartridges will vary based on the usage pattern. Due to the increased flexibility afforded by determining a distribution based on the usage history, the library manager can take into account the total count of scratch cartridges, thus eliminating leftover scratch cartridges altogether. After the library manager has determined the #GOAL_SC for each library string, control then flows to block 204.

At block 204, the library manager begins a first loop in which it determines which library strings have a number of scratch cartridges greater than their respective #GOAL_SC. The loop is initialized by generating a list of all library strings if not already available. The first library string in the list is made the current library string. Control then flows to block 206.

At block 206, the library manager determines if the current library string has more scratch cartridges than the current library's #GOAL_SC. If the current library string has more scratch cartridges than the #GOAL_SC for the current library string, control then flows to block 210. If the current library string has fewer scratch cartridges than the #GOAL_SC for that library string, control then flows to block 208.

At block 208, the library manager records an indication of the current library string, such as an identifier, to a new list, hereinafter referred to as the MOVE_TO list. The library manager also records the current count of scratch cartridges located in the current library string minus the #GOAL_SC for the current library string. This value represents the differential between the current count of scratch cartridges and the goal number of cartridges for the current library string. This value will be referred to hereinafter as the #DIFF_SC for the particular library string. All library strings on the MOVE_TO list will have a negative #DIFF_SC. Control then flows to block 212.

Control flowed to block 210 if the library manager determined that the current library string had a number of scratch cartridges greater than #GOAL_SC at block 206. At block 210, the library manager records an indication of the current library string, such as an identifier, and the #DIFF_SC for the current library string to a new list, referred to hereinafter as the MOVE_FROM list. All library strings on the MOVE_FROM list will have a positive #DIFF_SC. Control then flows to block 212.

Control flowed to block 212 from block 208 and block 210. At block 212, the library manager determines if there are more library strings in the list of all library strings. If more library strings are in the list of all library strings, control then flows back to block 204. If all library strings have been iterated over, control then flows to block 214.

At block 214, the first loop ends. The library manager will have iterated over each library string. The library manager will have two lists, a MOVE_TO and MOVE_FROM list, each indicating disjoint sets of library strings and the individual #DIFF_SC values. Library strings that already have a count of scratch cartridges equal to their #GOAL_SC will not appear on either list. Control then flows to block 316 in FIG. 3.

At block 316, the library manager begins a second loop in which the library manager distributes the scratch cartridges from library strings having a positive #DIFF_SC to those library strings that have a negative #DIFF_SC scratch cartridges. The loop is initialized by selecting the first library string of the MOVE_TO list as the current target library string. The first library string of the MOVE_FROM list is selected as the current source library string. On each subsequent pass through the loop, the library manager selects the next library string in the MOVE_TO list. Control then flows to block 318.

At block 318, the library manager generates and issues a move command specifying that a scratch cartridge should be moved from the source library to the target library. Some implementations may generate the command, save it, and then issue all move commands at the end. Control also flows back to block 318 if the library manager determines that the target library string has a negative #DIFF_SC value, creating a distribution loop specific to the current target tape library. Control then flows to block 320.

At block 320, the library manager decrements the current source library #DIFF_SC value and increments the current target library #DIFF_SC value. Decrementing and incrementing the respective #DIFF_SC values reflect the current state of the tape library if the move commands are issued. If the move commands are not issued, it reflects the state of the tape library as it will be after the move commands. Control then flows to block 322.

At block 322, the library manager determines if the #DIFF_SC value for the current source library string is greater than zero. If the current source library string has a #DIFF_SC value greater than zero, control then flows to block 325. If the current source library does not have a #DIFF_SC value greater than zero, control then flows to block 324.

At block 324, the library manager moves the pointer that indicates the current source library string in the MOVE_FROM list to the next library string in the MOVE_FROM list. Because the current source library string no longer has a surplus of scratch cartridges, the next library string in the MOVE_FROM list becomes the new source. Control then flows to block 325.

Control flowed to block 325 if the library manager determined that the current source library string still has a surplus of scratch cartridges at block 322. Control also flowed to block 325 from block 324. At block 325, the library manager determines if the #DIFF_SC value for the current target string is less than zero. A negative #DIFF_SC value indicates that the current target string has fewer scratch cartridges than the goal number of scratch cartridges. If the library manager determines that the current target library string has a negative #DIFF_SC, control then flows back to block 318. If the library manager determines that the current target library string does not have a negative #DIFF_SC, control then flows to block 326.

At block 326, the library manager moves the pointer that indicates the current target library string in the MOVE_TO list to the next library string in the MOVE_TO list. Because the current target library string no longer has less scratch cartridges than the goal number, the next library string in the MOVE_TO list becomes the new target. Control then flows to block 327.

At block 327, the library manager determines whether there are more library strings in the MOVE_TO list. This can be determined by checking to see if the MOVE_TO pointer is pointing to the last library string in the list or not. If the library manager determines that there are more library strings in the MOVE_TO list, control flows back to block 316. If the library manager determines that there are no more library strings in the MOVE_TO list, control then flows to block 328.

At block 328, the library string ends the scratch cartridge distribution loop. The scratch cartridges are distributed among the library strings in accordance with the particular distribution used by the library manager, with the exception of any leftover scratch cartridges. The library manager may choose to distribute the remaining scratch cartridges as discussed above or leave them where they are.

When a program requests use of a scratch cartridge, the library manager first searches for a scratch cartridge. After finding a scratch cartridge, the library manager then searches for an available tape drive. If a scratch cartridge is found in the first of three library strings, and the only available tape drive is in the third, the library manager moves the scratch cartridge from the first library string to the third. If the third library string has a scratch cartridge, this movement is unnecessary and inefficient.

Furthermore, even efficient distribution of scratch cartridges, as discussed above, does not make tape library usage more predictable. While some programs will run at regular intervals, and may request use of the tape library at predictable intervals, many programs do not. Thus, there may be a sudden, unexpected increase in requests to use the tape library that the library manager cannot prepare for. Furthermore, even when programs run at regular intervals, the amount of data that the programs read or write may be different, leading to unpredictable tape drive availability. For example, a backup program that backs up the data on a particular server may run daily at the same time. But many backup programs do incremental backups, backing up only the data that changed since the most recent backup. Thus, if very little data has changed, the particular tape drive that the library manager selects may be in use for a very short period of time. If a large portion of data has changed, the particular tape drive that the library manager selects may be in use for a long period of time. This unpredictability can lead to scenarios in which the library manager searches for scratch cartridges outside of a library string containing an unavailable tape drive.

Figure 4:
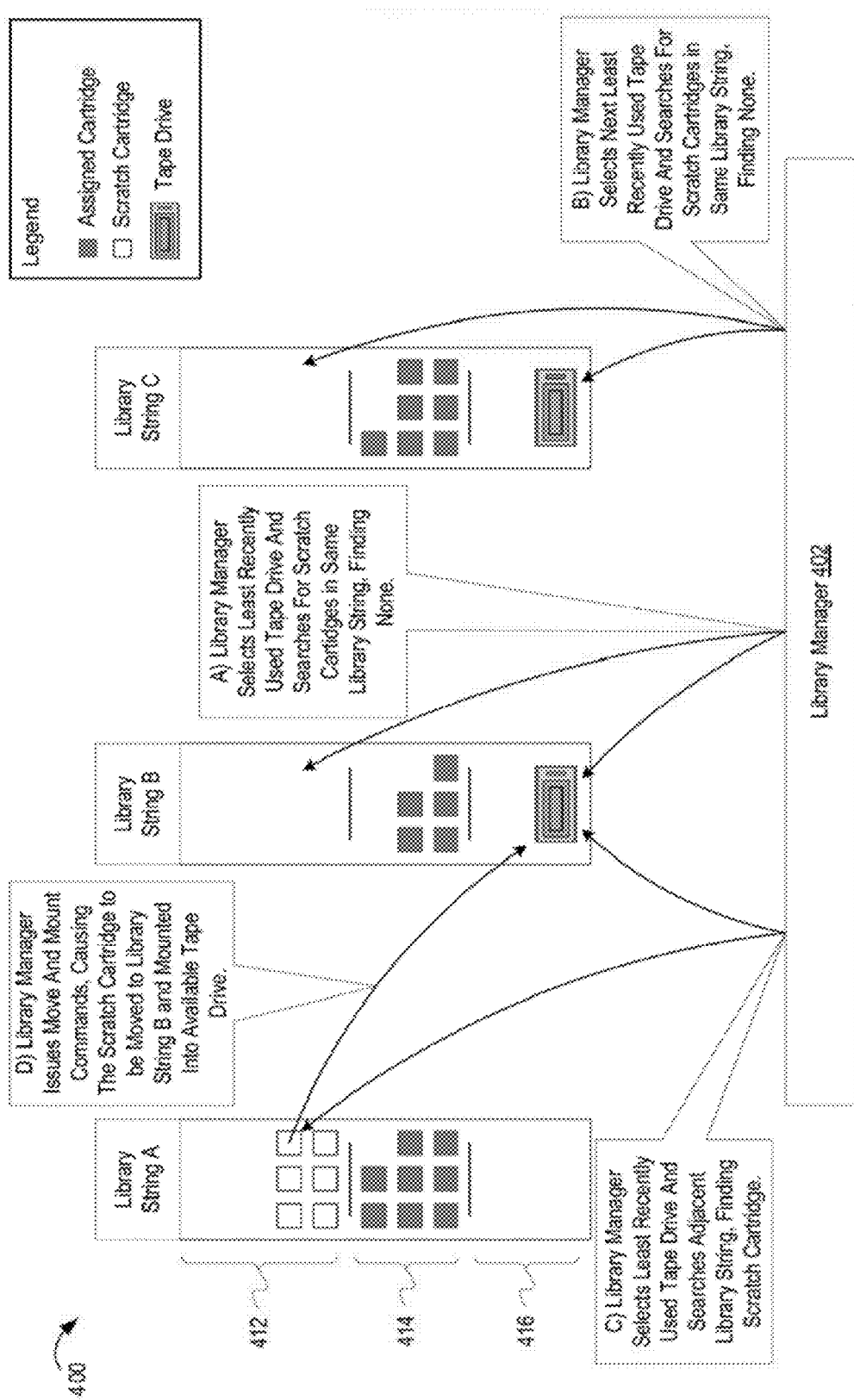
FIG. 4 depicts a tape library system that is designed to efficiently find an available tape drive and scratch cartridge, minimizing the distance travelled by a scratch cartridge.

FIG. 4 depicts a tape library system that is designed to efficiently find an available tape drive and scratch cartridge, minimizing the distance travelled by a scratch cartridge.

FIG. 4 depicts a tape library 400, including a library manager 402 and three library strings: A, B, and C. The depiction of each library string is broken into three sections, one for a set of scratch cartridges 412, one for a set of assigned cartridges 414, and one for a set of tape drives 416. Any one of the sets 412, 414, and 416 may be empty. Each library string is connected in some way that allows cartridges to be moved from any library string to any other library string, such as a shuttle connection (not depicted).

At stage A, the library manager 402 selects the least recently used tape drive. The library manager 402 can keep track of the individual tape drives and their usage or can query each tape drive to find when each was last used. In this example, the tape drive in library string B is the least recently used tape drive, and is thus selected by the library manager 402. The library manager 402 then determines if there is a scratch cartridge in the same library string as the selected tape drive. If so, the library manager 402 uses a scratch cartridge from the same library string as the selected tape drive. If not, the library manager 402 selects the next least recently used tape drive.

At stage B, the library manager 402 selects the next least recently used tape drive, located in library string C. The library manager 402 once again determines if any scratch cartridges exist in the same library string as the selected tape drive. If so, the library manager 402 uses a scratch cartridge from the same library string as the selected tape drive. If not, the library manager 402 continues selecting available tape drives, in order from least recently used to most recently used, and determines if a scratch cartridge exists in the same library string. The library manager 402 can skip available tape drives if they are located in the same library string as a previously selected tape drive because it has already determined that no scratch cartridges are in that library string.

At stage C, the library manager 402 has selected each available tape drive and determined that no scratch cartridge exists in the same library string as an available tape drive. The library manager 402 selects the least recently used tape drive again, located in library string B. The library manager 402 then determines if a scratch cartridge exists in any adjacent library string. If a scratch cartridge exists in an adjacent library string, the library manager 402 selects the scratch cartridge. In this example, the library manager finds a scratch cartridge in library string A.

At stage D, the library manager 402 issues a move command, instructing the tape library 400 to move the scratch cartridge found at stage C from library string A to library string B. The library manager 402 also issues a mount command, instructing the tape library 400 to mount the scratch cartridge found at stage C. To mount the scratch cartridge, the scratch cartridge is inserted into the available tape drive.

In some embodiments, if no scratch cartridge is available in any of the library strings with available tape drives, the library manager 402 will select the least recently used tape drive as above. But if no scratch cartridge is found in an adjacent library string, the library manager 402 will not search library strings that are farther away. Instead, the library manager 402 will search the list of available drives until an available tape drive in another library string is found. The library manager 402 will then search library strings adjacent to the library string with the second chosen tape drive. Again, if no scratch cartridges are found in adjacent library strings, the library manager 402 will continue through the list until it finds a third available tape drive in a third library string. This process is repeated until the list is exhausted or a scratch cartridge is found in a library string adjacent to an available drive. If no scratch cartridge is found, the process is repeated, but the library manager 402 searches library strings that are two library strings away. This increasing search radius is continued until a scratch cartridge is found.

Figure 5:
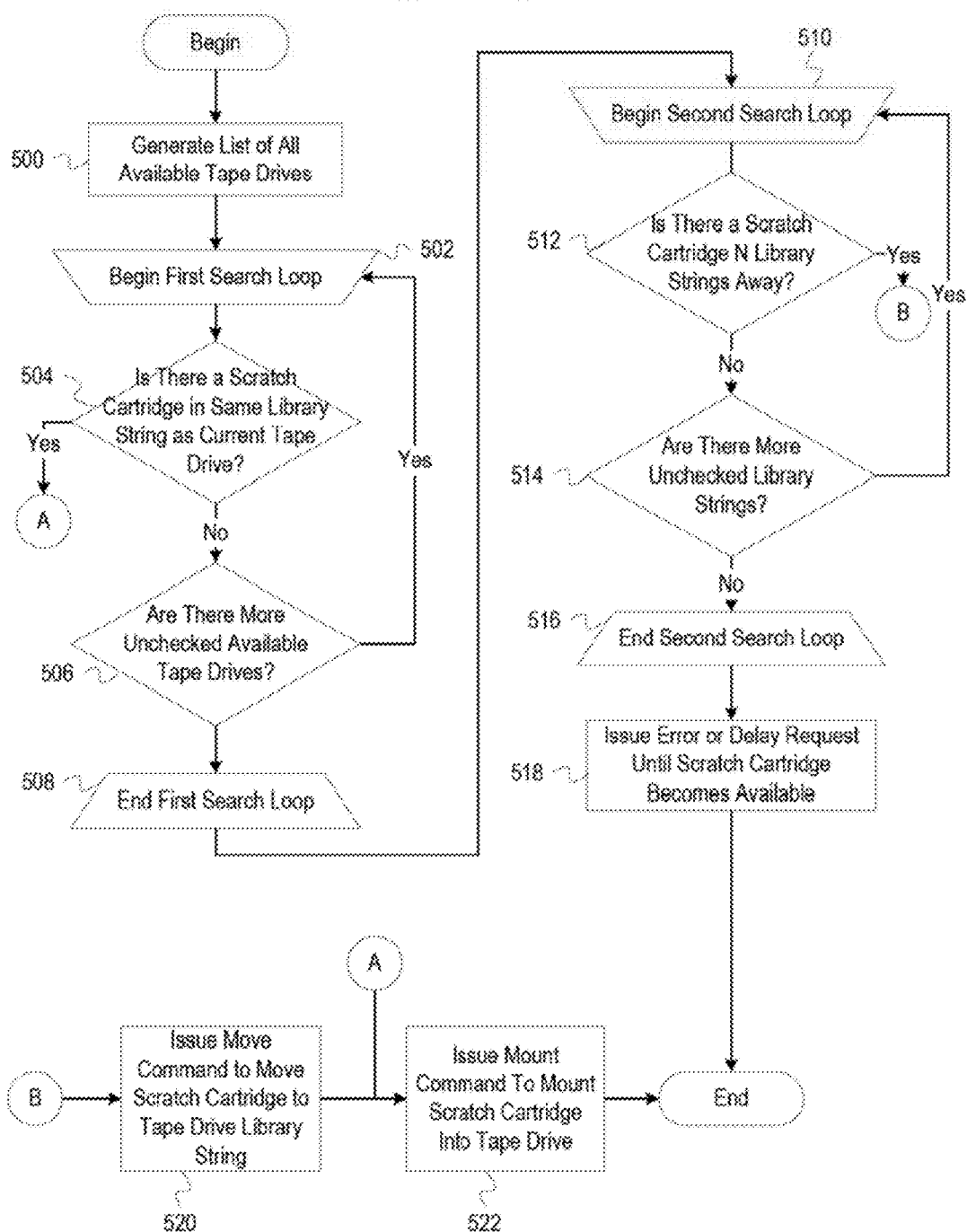
FIG. 5 depicts a flowchart of example operations a library manager can perform to find an available tape drive and scratch cartridge.

FIG. 5 depicts a flowchart of example operations a library manager can perform to find an available tape drive and scratch cartridge.

At block 500, the library manager generates a list of all available tape drives. The list will be used to find available tape drives in least recently used order, and thus can be sorted from least recently used tape drive to most recently used tape drive. The library manager can accomplish this without a list, polling each tape drive to see if it is available and when it was last used. After generating a list of all available tape drives, control then flows to block 502.

At block 502, the library manager begins an initial search loop in which it attempts to find a scratch cartridge in the same tape library as an available tape drive. The library manager initializes the loop selecting the least recently used tape drive from the list generated in block 500 as the current scratch cartridge. If a list was not generated, the library manager searches the tape library for the least recently used tape drive directly. On each additional pass through the loop, the library manager selects the next least recently used available tape drive that is in a library string that has not already been checked. Control then flows to block 504.

At block 504, the library manager determines if there is a scratch cartridge in the same library string as the current tape drive. The library manager can determine if there is a scratch cartridge in the same library string as the current tape drive by referring to the tape library state information it keeps track of, polling the library string, or taking other action based on the specific implementation. If the library manager determines there is a scratch cartridge in the same library string as the current tape drive, control then flows to block 522. If the library manager determines there is no scratch cartridge in the same library string as the current tape drive, control then flows to block 506.

At block 506, the library manager determines if there are more unchecked available tape drives. The library manager will make the determination depending on the specific actions taken at block 500. To more efficiently search the library strings, the library manager will ignore tape drives that are in library strings that have already been checked on previous iterations. If the library manager determines there are more unchecked available tape drives, control then flows back to block 502. If the library manager determines there are no more unchecked available tape drives, control then flows to block 508.

At block 508, the library manager completes the first scratch cartridge search loop. At this point in the process, the library manager has searched all library strings with available tape drives and found none that have scratch cartridges. Control then flows to block 510.

At block 510, the library manager begins a second search loop, in which it searches for a scratch cartridge that is closest to the least recently used tape drive. The library manager initializes the loop by selecting the least recently used tape drive and initializing a variable, N, to 1. The variable N represents the number of library strings away from the library string containing the least recently used tape drive to search. On each additional iteration, the library manager increments N. Control then flows to block 512.

At block 512, the library manager determines if there is a scratch cartridge N library strings away from the selected tape drive. On the first pass through the loop beginning at block 510, N will be 1, and thus the library manager will search adjacent library string for scratch cartridges. On the second pass through the loop beginning at block 510, N will be 2, and thus the library manager will search library strings that are two library strings away. If the library manager determines there is a scratch cartridge N library strings away from the selected tape drive, control then flows to block 520. If the library manager determines there is no scratch cartridge N library strings away from the selected tape drive, control then flows to block 514.

At block 514, the library manager determines if there are more unchecked library strings. The library manager can determine this by calculating the number of library strings between the tape drive and the edge library strings. The library manager then selects the distance to the furthest edge library string, and compares its distance with N. If N is equal to the distance to the furthest edge library string, all library strings have been checked. If the library manager determines that there are more unchecked library strings, control then flows back to block 510. If the library manager determines that there are no more unchecked library strings, control then flows to block 516.

At block 516, the library manager completes the second search loop. The library manager has found no available scratch cartridges, and thus all cartridges are in use. Control then flows to block 518.

At block 518, the library manager either issues an error to the program requesting use of a scratch cartridge or delays processing the request until a scratch cartridge becomes available. Errors or other notifications can be made to alert operators that all scratch cartridges are being used.

Control flowed to block 520 if the library manager found a scratch cartridge at block 512. At block 520, the library manager issues a move command to move the scratch cartridge from the source library string to the target library string. The target library string is the library string with the least recently used tape drive. Control then flows to block 522.

Control flowed to block 522 if the library manager found a scratch cartridge at block 504. Control also flowed to block 522 from block 520. At block 522, the library manager issues a mount command, specifying the available tape drive and the scratch cartridge that is located in the library string with the available tape drive. The tape library thus mounts the scratch cartridge into the available tape drive, making it available for the requesting program.

Optimizing the distribution of scratch cartridges and other components of a tape library, along with optimizing the selection of available tape drives and scratch cartridges may increase the efficiency of a tape library. But additional efficiency can be gained by utilizing movement of various components to accomplish multiple tasks at the same time. For example, if scratch cartridges are unevenly distributed, the library manager may want to redistribute them in an efficient manner, as discussed above. But if the library manager is servicing a large number of requests at one time, the library manager may not be able to stop servicing those requests to redistribute the scratch cartridges.

When the tape library services a request, there are times when the various mechanisms that transport the cartridges move from one location to another while empty. This can be wasted movement. For example, assume a tape library has three library strings. The first library string contains ten scratch cartridges and the car for a single shuttle connection. The third library string contains no scratch cartridges. If the tape library receives a request to get a cartridge from the third library string and move it to another, the car would typically be empty as it traveled from the first library string to the third. But, a tape library can be designed such that the car transports one of the ten scratch cartridges to the third library string from the first library string, accomplishing two goals at once.

Figure 6:
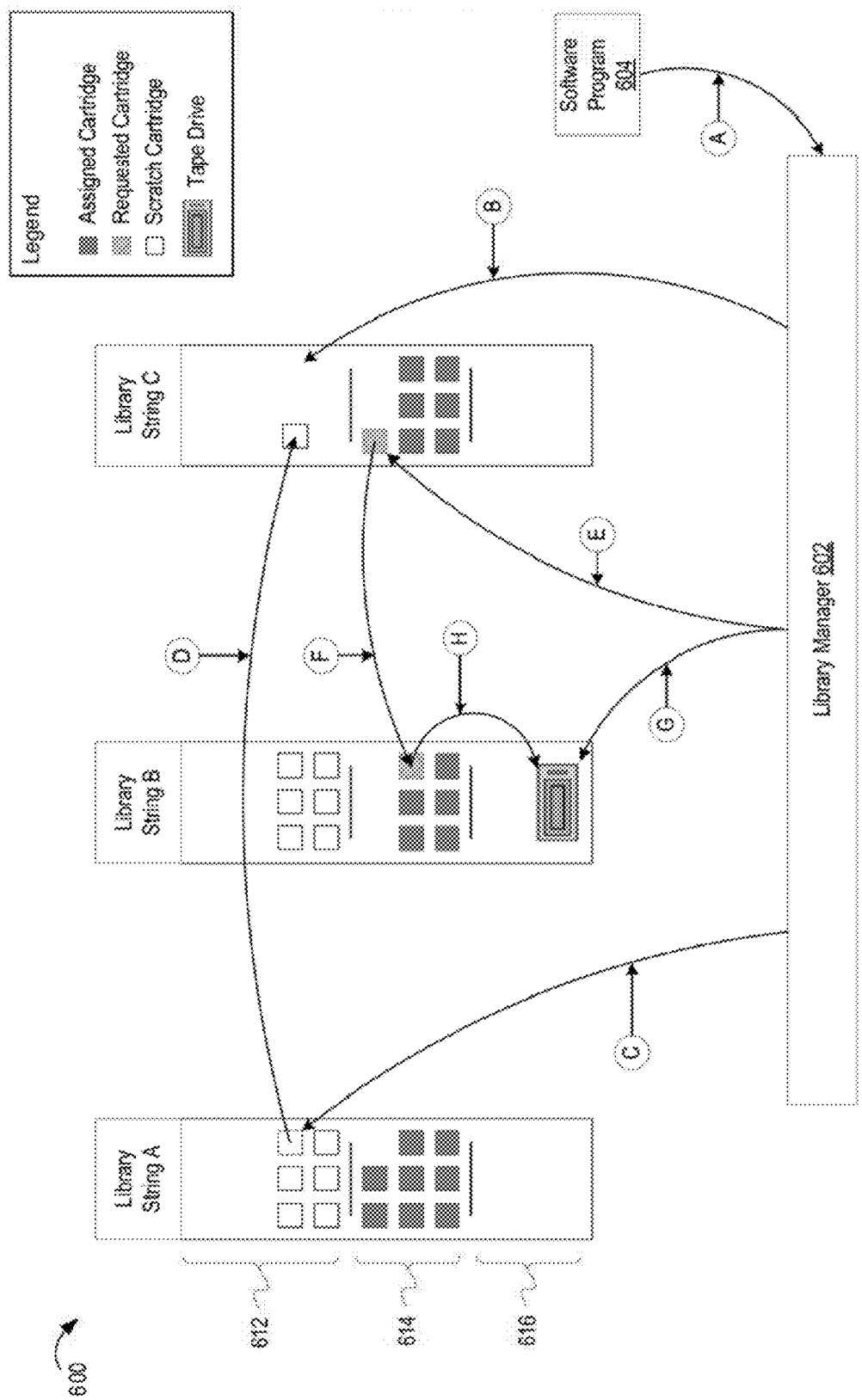
FIG. 6 depicts a tape library system that is designed to distribute scratch cartridges in conjunction with the servicing of other requests.

FIG. 6 depicts a tape library system that is designed to distribute scratch cartridges in conjunction with the servicing of other requests. FIG. 6 depicts a tape library 600, including a library manager 602 and three library strings: A, B, and C.

The depiction of each library string is broken into three sections, one for a set of scratch cartridges 612, one for a set of assigned cartridges 614, and one for a set of tape drives 616. Any one of the sets 612, 614, and 616 may be empty. Each library string is connected in some way that allows cartridges to be moved from any library string to any other library string, such as a shuttle connection (not depicted). A software program 604 is also depicted.

At stage A, the software program 604 requests the use of a cartridge from the library manager 602. This scenario can occur when the software program 604 previously requested a scratch cartridge to write data to. After the software program 604 completed writing the data, the library manager 602 assigned the cartridge to the software program 604. After some time, the software program 604 requests the use of the cartridge again to either read the previously written data or write more data. The library manager 602, after receiving the request to use the cartridge from the software program 604, determines that the requested cartridge is in library string C, and that an available tape drive is in library string B. The library manager 602 also determines the location of the shuttle connection car. In this example, the car is assumed to be in library string A.

At stage B, the library manager 602 determines that library string C has no scratch cartridges. The library manager 602 may determine the number of scratch cartridges in a particular library string by polling the library string, looking up the number of scratch cartridges in state data that the library manager 602 tracks, or other ways that are specific to the particular implementation.

At stage C, the library manager 602 determines that there are scratch cartridges in library string A, the starting location of the car. The library manager 602 also determines that moving a scratch cartridge to library string C may have a beneficial impact on efficiency. For example, if a library manager 602 is configured to distribute scratch cartridges evenly, as discussed above, the library manager 602 can determine that by moving a scratch cartridge from library string A to library string C, the distribution becomes closer to an even distribution. Thus, the library manager 602 issues a command to move a scratch cartridge from library string A to library string C.

At stage D, the tape library 600 moves the scratch cartridge from library string A to library string C. The tape library 600 first loads the scratch cartridge into the empty car for the shuttle connection. The tape library 600 then causes the car to move along the shuttle connection from library string A to library string C. The tape library 600 then has the scratch cartridge deposited into library string C.

At stage E, the library manager 602 issues a command to move the requested cartridge from the source library string, library string C, to the target library string, library string B. Because the software program 604 requested use of the cartridge, the cartridge is mounted into a tape drive. At stage A, the library manager 602 determined that the only available tape drive was in library string B. Thus, to mount the cartridge into an available tape drive, the library manager 602 issues a command to move the requested cartridge from library string C to library string B.

At stage F, the tape library 600 moves the requested cartridge from library string C to library string B. Similar to stage D, the tape library 600 first loads the requested cartridge into the empty car for the shuttle connection. The tape library 600 then causes the car to move along the shuttle connection from library string C to library string B. The tape library 600 then has the requested cartridge deposited into library string B.

At stage G, the library manager 602 issues a command to mount the requested cartridge into the available tape drive.

At stage H, the tape library 600 mounts the cartridge into the available drive. The tape library 600 moves the cartridge from where it was deposited by the shuttle connection to the library frame in which the available tape drive is located. The tape library 600 then causes the library frame robotic arm to insert the cartridge into the tape drive.

Any movement of a shuttle connection car in which the car is empty has the potential to be inefficient. If the library manager 602 had only issued the command to move the requested cartridge from library string C to library string B, the car would have moved from library string A to library string C while empty. The tape library 600 described above increases efficiency by incrementally improving the state of the tape library 600 by using the movement of components that would normally be partially wasted movement.

In some embodiments, the library manager is not limited to redistributing scratch cartridges while servicing a request. If a library manager receives multiple requests, those requests may be reordered or combined to increase efficiency. For example, assume a tape library with three library strings and one shuttle connection with the car located at the first library string. The library manager can get two requests, a first that requests a cartridge be moved from the third library string to the second, and a second that requests a cartridge be moved from the first library string to the third. If the library manager completes the requests in this order, the car travels a total of six library strings. The library manager can either reorder the requests, or combine the requests to decrease the number of library strings traveled to three. Instead of completing the first request first, the library manager would move the second requested cartridge from the first library string, where the car starts, to the third library string. The library manager would then load the first requested cartridge into the car and move it to the second library string.

Figure 7:
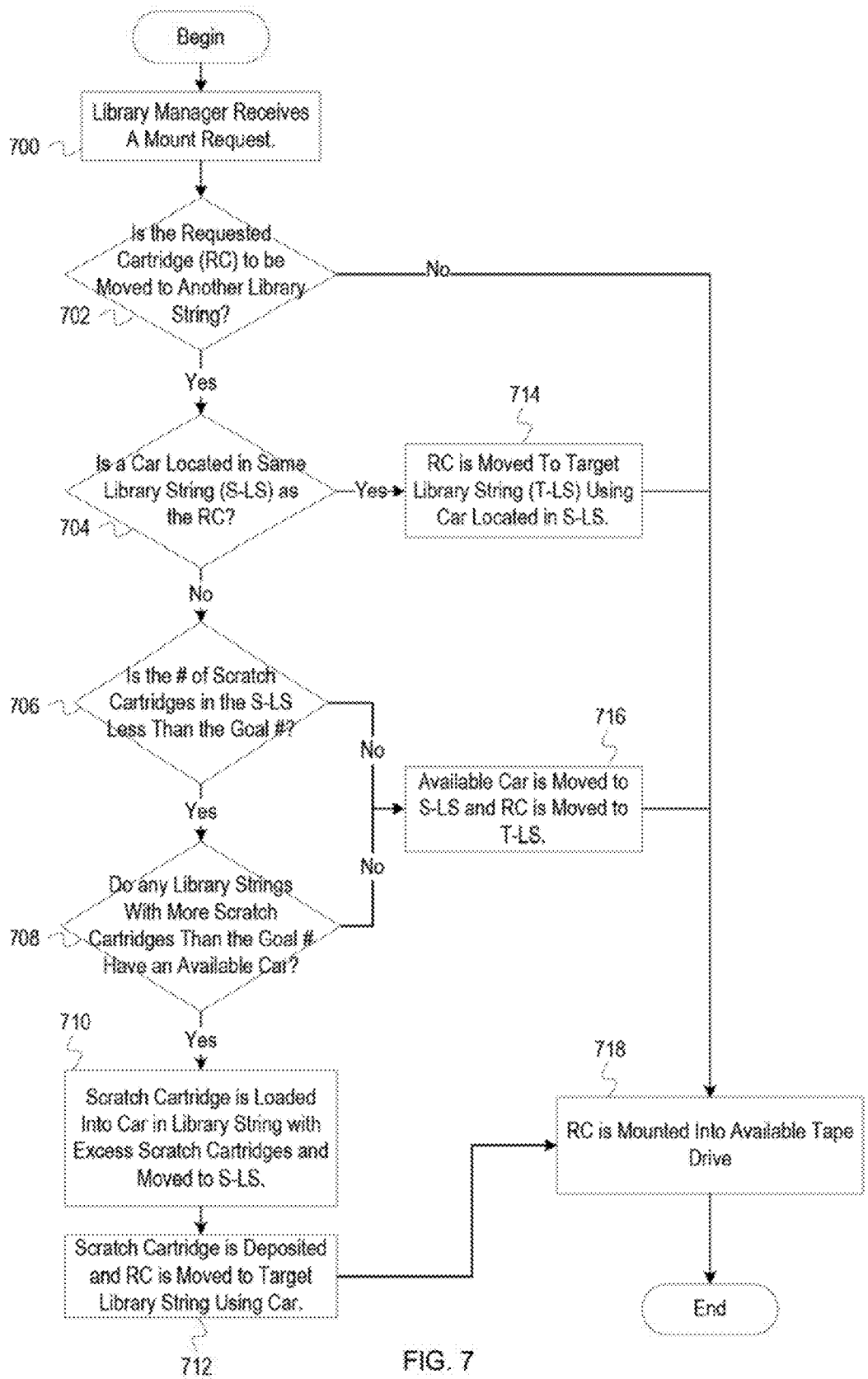
FIG. 7 depicts a flowchart of example operations a library manager can perform to distribute scratch cartridges while servicing other requests.

FIG. 7 depicts a flowchart of example operations a library manager can perform to distribute scratch cartridges while servicing other requests.

At block 700, a library manager receives a request to mount a cartridge. As discussed above, this can occur when a software program has previously written to a particular cartridge, and wants to read from or write to the same cartridge. Control then flows to block 702.

At block 702, the library manager determines whether the requested cartridge is to be moved to another library string. This scenario arises when the only available tape drive is in a library string different from the one that has the requested cartridge. If the requested cartridge is in the same library string as an available tape drive, no movement between library strings is done. If the library manager determines that the requested cartridge is to be moved to another library string, control then flows to block 704. If the library manager determines that the requested cartridge is not to be moved to another library string, control then flows to block 718.

At block 704, the library manager determines if a car for a shuttle connection is located in the same library string as the requested cartridge. If the library manager determines that a car is located in the same library string as the requested cartridge, control then flows to block 714. If the library manager determines that a car is not located in the same library string as the requested cartridge, control then flows to block 706.

At block 706, the library manager determines if the library string with the requested cartridge has a deficiency of scratch cartridges. The goal value can be determined any number of ways, including as part of a distribution algorithm or being manually set by an operator. For example, in the example distributions discussed above, each particular distribution has a goal for the number of scratch cartridges in each library string. If the library manager is configured to evenly distribute the scratch cartridges, there are three library string, and there are nine scratch cartridges, then the goal would be three scratch cartridges in each library string. Thus, the library manager would consider a library string with less than three scratch cartridges as having a deficiency of scratch cartridges. If the library manager determines that there is a deficiency of scratch cartridges in the library string with the requested cartridge, control then flows to block 708. If the library manager determines there is not a deficiency of scratch cartridges in the library string with the requested cartridge, control then flows to block 716.

At block 708, the library manager determines if any library strings with an available car have an excess of scratch cartridges. As discussed above with block 706, each library string can have a goal value for the number of scratch cartridges the library string should have. If a particular library string has a higher number of scratch cartridges than the library string's goal value, it has an excess of scratch cartridges. If a library string has an excess of scratch cartridges but no available car, some of the efficiency would be lost by moving a car to the library string with an excess of scratch cartridges. If the library manager determines that a library string has an excess of scratch cartridges and an available car, control then flows to block 710. If the library manager determines that no library strings have an excess of scratch cartridges and an available car, control then flows to block 716.

At block 710, a scratch cartridge is loaded into an available car located in a library string with an excess of scratch cartridges. The scratch cartridge is also moved, via the car, to the library string containing the requested cartridge. Control then flows to block 712.

At block 712, the scratch cartridge is deposited into the library string containing the requested cartridge. The requested cartridge is then loaded into the car that brought the scratch cartridge. The requested cartridge is then moved to the library string with the available tape drive via the car. Control then flows to block 718.

Control flowed to block 714 if the library string determined that a car was located in the same library string as the requested cartridge at block 704. At block 714, the requested cartridge is moved to the library string with the tape drive using the car located in the library string containing the requested cartridge. Because a car is located in the same library string as the requested cartridge, no efficiency is gained by waiting for another car to be moved to the same library string. Control then flows to block 718.

Control flowed to block 716 if the library manager determined that the library string containing the requested cartridge does not have an excess of scratch cartridges at block 706. Control also flowed to block 716 if the library manager determined that no library string contained an excess of scratch cartridges and contained an available car. At block 716, the available car is moved to the library string containing the requested cartridge. The requested cartridge is loaded into the car, and the car transports the requested cartridge to the library string with the available tape drive. Control then flows to block 718.

Control flowed to block 718 if the library manager determined that the requested cartridge was in the same library string as the available tape drive at block 702. Control also flowed to block 718 from block 712, block 714, and block 716. At block 718, the requested cartridge is mounted into the available tape drive. The requested cartridge may be moved from the library frame containing the shuttle connection to the library frame containing the available tape drive if they are different. The library frame robotic arm then inserts the requested cartridge into the available tape drive. The process ends.

The inventive subject matter is not limited to moving cartridges between library strings, and can be used to increase the efficiency of movement within an individual library string as well. In other words, the movement of cartridges between library frames within the same library string can be optimized similarly to the movement of cartridges between library strings. Additionally, most examples discussed tape libraries with only one shuttle connection. The inventive subject matter is not so limited, and can apply to tape libraries with any number of library frames, library strings, and shuttle connections. Furthermore, references are made to utilizing a least recently used algorithm to select specific components from a set of components. The inventive subject matter is not limited to using a least recently used algorithm, and may use others including a most recently used algorithm, an algorithm based on component utilization, a random selection algorithm, etc.

As example flowcharts, the flowcharts depicted present operations in example order from which embodiments can deviate (e.g., operations can be performed in a different order than illustrated and/or in parallel). Many of the specific operations will be dependent on the actual implementation. For example, additional operations are needed if the library manager is not the sole interface that communicates with the tape library components. Also, as discussed, if the library manager or other related software keeps updated state information about the tape library, no gathering of information is done in any of the flowcharts. Some optimization operations are not included in the flowcharts or discussed, as they would be apparent to one skilled in the art. For example, if the current state of the tape library is such that few operations are required to achieve the desired distribution of cartridges, the library manager may forego any distribution of the cartridges. In other words, if the current state of the tape library is near enough to the goal state, the efficiency gained by further distributing the cartridges may be less than the cost of distributing the cartridges.

Although library frames are discussed as being connected side-by-side, they may be connected in any manner that permits cartridges to be transported from one to another. Additionally, the library manager is described as doing many of the operations. The inventive subject matter is not so limited. The software programs that are discussed as interacting with the library manager may interact directly with the tape library in some implementations, and may implement all techniques discussed. The library manager can be a part of the tape library or separate from the tape library, such as being embodied as a separate server that is coupled to the tape library. The functionality discussed can also be implemented in hardware or firmware, in addition to software, or as a combination of all three. Furthermore, the library manager can be a collection of different software applications that interact to perform the operations described herein. For example, the actual interface with the tape library may be embodied in a SCSI card located on a server. The library manager would interface with the SCSI card, and the SCSI card would interface with the tape library by issuing the actual commands and receiving responses or other messages from the tape library.

The idea of efficiency is discussed throughout. Efficiency can be defined many ways, including ways not specifically discussed. For example, efficiency is frequently discussed as being tied to the distance a component travels, the time it takes for the component to travel between locations, or the cost or amount of electricity used. But efficiency can also apply to things such as decreasing the amount of wear and tear on the system or, similarly, extending the life of particular components. As such, when discussing efficiency, the inventive subject matter is not limited to the specific types of efficiency referenced.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
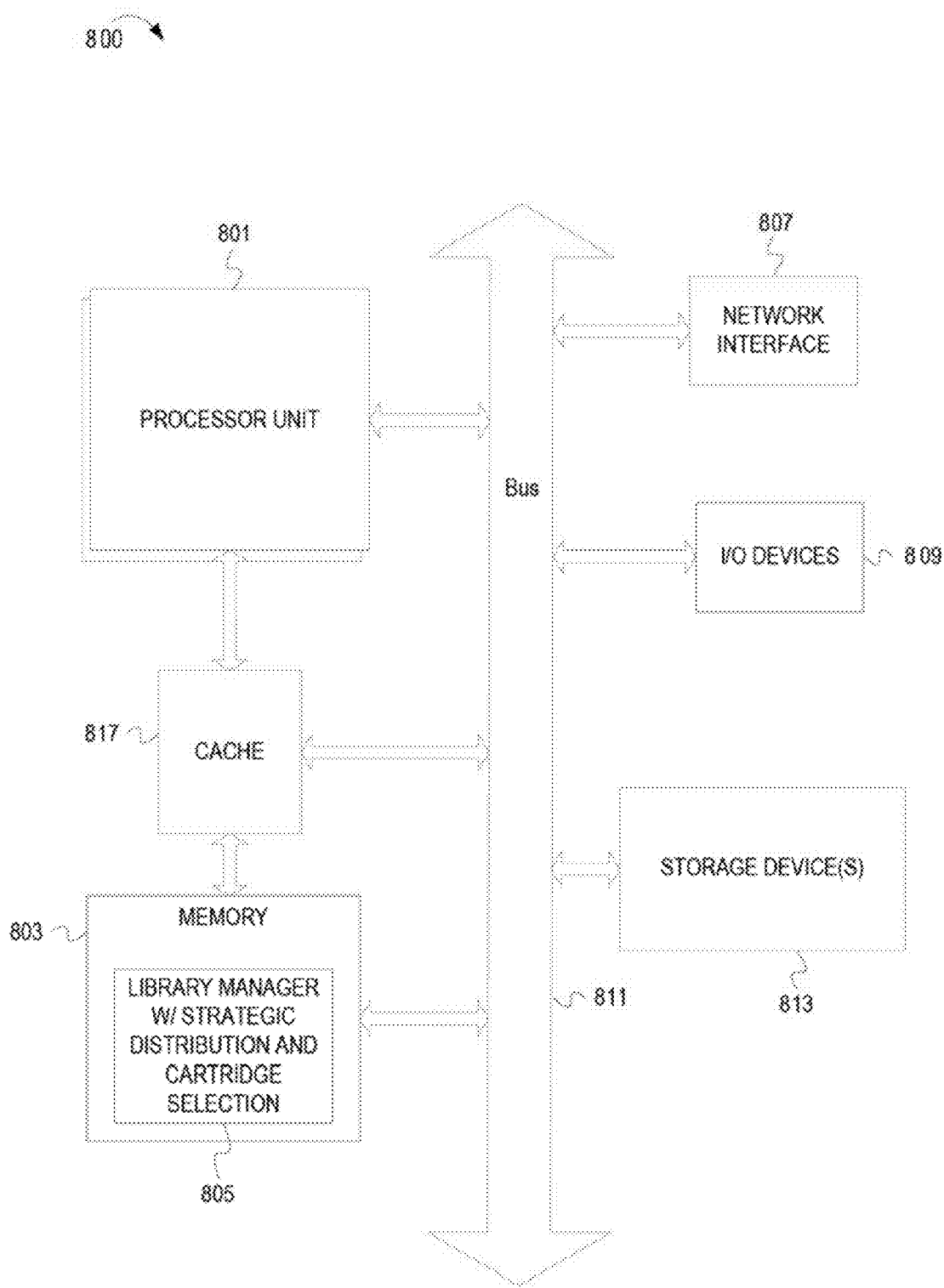
FIG. 8 depicts an example computing system with a library manager.

FIG. 8 depicts an example computing system with a library manager. A computing system includes a processor unit 801 (possibly including multiple processors, multiple cores, multiple nodes, and/or implementing multi-threading, etc.). The computing system includes memory 803. The memory includes a library manager with strategic distribution and cartridge selection (library manager) 805. The memory 803 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 811 (e.g., PCI, ISA, PCI-Express, HyperTransport® bus, InfiniBand® bus, NuBus bus, etc.), I/O devices 809 (e.g., keyboard, mouse, monitor, microphone, speaker, etc.), a network interface 807 (e.g., an ATM interface, an Ethernet interface, a Frame Relay interface, SONET interface, wireless interface, etc.), a cache 817 (e.g., a direct mapped cache, a 2-way set associative cache, a fully associative cache, etc.) and a storage device(s) 813 (e.g., optical storage, magnetic storage, etc.). The cache 817 may be a lower level cache (e.g., L1 cache embodied in a processor) or a higher level cache (e.g., L2 cache, L3 cache, etc.). The library manager 805 embodies functionality to implement embodiments described above. The library manager 805 functions as described above, distributing scratch cartridges and other components between the various parts of a tape library. The library manager 805 also selects scratch cartridges for available tape drives in response to a request. Additionally, the library manager 805 can manage requests in such a way that accomplishes multiple goals at the same time, such as distributing cartridges while servicing a request or reordering and combining requests to increase efficiency. Although the library manager 803 is depicted as residing in the memory 803, any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Additionally, functionality may be embodied in other components, such as the interface with the tape library being part of the network interface 807. Further, realizations may include fewer or additional components not illustrated in FIG. 8 (e.g., video cards, audio cards, additional network interfaces, peripheral devices, etc.). The processor unit 801, storage device(s) 813, network interface 807, cache 817, and I/O devices 809 are coupled to the bus 811. Although illustrated as being coupled to the bus 811, the memory 803 may be coupled to the processor unit 801.

While the embodiments are described with reference to various implementations and exploitations, it will be understood that these embodiments are illustrative and that the scope of the inventive subject matter is not limited to them. In general, techniques for mass storage systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product comprising a computer readable storage medium having program instructions embodied therewith, the program instructions comprising program instruction to:
   determine a distribution for a plurality of distributable components within a storage medium library, wherein the storage medium library comprises a plurality of library units, wherein the program instructions to determine the distribution for the plurality of distributable components with the storage medium library comprise program instructions to,
      determine a count of the distributable components within the storage medium library;
      determine a count of all storage medium drives within the storage medium library;
      determine a first value as a quotient of the count of distributable components within the storage medium library by the count of storage medium drives within the storage medium library;
      determine a count of storage medium drives in a first of the plurality of library units; and
      determine a goal value by multiplying the first value by the count of storage medium drives in the first of the plurality of library units, wherein the goal value is a goal value of distributable component for the first of the plurality of library units;
   determine that the plurality of distributable components are not currently distributed across the storage medium library in accordance with the distribution; and
   responsive to a determination that the distribution for the plurality of distributable components and a determination that the plurality of distributable components are not currently distributed across the storage medium library in accordance with the distribution, issue a set of one or more commands to move one or more of the plurality of distributable components to different locations of the storage medium library in accordance with the distribution.

2. The computer program product of claim 1, wherein the plurality of distributable components comprises one of storage media and storage media cars, wherein the storage media cars transport storage media.

3. The computer program product of claim 1, wherein the program instructions to issue a set of one or more commands to move one or more of the plurality of distributable components to different locations of the storage medium library in accordance with the distribution comprises a program instructions to:
   determine whether the first of the plurality of library units has a count of distributable components from the plurality of distributable components located in the first of the plurality of library units that is lower than the goal value;
   in response to a determination that the first of the plurality of library units has the count of distributable components located in the first of the plurality of library units that is lower than the goal value,
      determine a second of the plurality of library units having a count of distributable components from the plurality of distributable components located in the second of the plurality of library units that is greater than a goal value of distributable component for the second of the plurality of library units; and
      issue a set of one or more commands to move one or more of the plurality of distributable components from the second of the plurality of library units to the first of the plurality of library units; and
   in response to in response to a determination that the first of the plurality of library units has the count of distributable components located in the first of the plurality of library units that is greater than the goal value,
      determine a third of the plurality of library units having a count of distributable components from the plurality of distributable components located in the third of the plurality of library units that is less than a goal value of distributable component for the third of the plurality of library units; and
      issue a set of one or more commands to move one or more of the plurality of distributable components from the first of the plurality of library units to the third of the plurality of library units.

4. The computer program product of claim 1, wherein the plurality of distributable components comprises unassigned distributable components.

5. The computer program product of claim 1, wherein the determination of the distribution for the plurality of distributable components within the storage medium library is based, at least in part, on one of,
   data that represents, at least in part, the state of the storage medium library, and one or more communications with the storage medium library to determine, at least in part, the state of the storage medium library.

6. The computer program product of claim 1, wherein the plurality of distributable components comprises tape cartridges, the storage medium library comprises a tape library and a library unit is one of a library frame and library string.

7. An apparatus comprising:
a network interface;
a processor; and
a computer readable storage medium coupled with the processor, the computer readable storage medium having computer usable program code embodied therewith, the computer usable program code which, when executed by the processor, causes the apparatus to,
determine the state of a storage medium library, wherein the computer usable program code which, when executed by the processor, causes the apparatus to determine the state of the storage medium library comprises computer usable program code which, when executed by the processor, causes the apparatus to,
determine a count of the distributable components within the storage medium library;
determine a count of all storage medium drives within the storage medium library; and
determine a count of storage medium drives in a first of a plurality of library units;
determine a distribution for the plurality of distributable components within the storage medium library based, at least in part, on the state of the storage medium library wherein the computer usable program code which, when executed by the processor, causes the apparatus to determine a distribution for the plurality of distributable components within the storage medium library based, at least in part, on the state of the storage medium library comprises computer usable program code which, when executed by the processor, causes the apparatus to,
determine a first value as a floor of a quotient of the count of distributable components within the storage medium library by the count of storage medium drives within the storage medium library and determining the floor of the quotient;
determine a goal value by multiplying the first value by the count of storage medium drives in the first of the plurality of library units, wherein the goal value is a goal value of distributable component for the first of the plurality of library units; and
responsive to a determination of the distribution for the plurality of distributable components within a storage medium library, issue commands distributing the plurality of distributable components within the storage medium library in accordance with the distribution.

8. The apparatus of claim 7, wherein a storage medium library comprises the apparatus.

9. The apparatus of claim 8, wherein each of the storage medium drives is configured to read a storage medium and write a storage medium.

10. The apparatus of claim 9, wherein the computer usable program code further causes the processor to:
receive a request to mount a storage medium;
determine a set of one or more storage medium drives, wherein the storage medium drive is available to host a storage medium;
determine a set of one or more distributable components, wherein the distributable components are available to be mounted;
responsive to a determination of the set of one or more storage medium drives and a determination of the set of one or more distributable components, select one of the set of one or more storage medium drives and one of the set of one or more distributable components, wherein the storage medium drive and storage medium is selected based, at least in part, on the distance between the storage medium drive and the storage medium; and
issue at least one command to mount the selected storage medium into the selected storage medium drive.

11. The apparatus of claim 7, wherein the plurality of distributable components comprises one of a plurality of storage media and a plurality of storage media cars, wherein the storage media cars transport storage media.

12. The apparatus of claim 11, wherein the plurality of storage media comprises tape cartridges and the storage medium library comprises a tape library.

13. The apparatus of claim 7, wherein the network interface is coupled with the storage medium library.

* * * * *